United States Patent
Chen et al.

(10) Patent No.: US 7,420,715 B2
(45) Date of Patent: Sep. 2, 2008

(54) METHOD AND SYSTEM FOR PROMOTING SCANNING SPEED

(75) Inventors: Chun-Jen Chen, Taichung (TW); Kuo-Jeng Wang, Kaohsiung (TW)

(73) Assignee: Transpacific IP, Ltd., Taipei (TW)

( * ) Notice: Subject to any disclaimer, the term of this patent is extended or adjusted under 35 U.S.C. 154(b) by 734 days.

(21) Appl. No.: 10/011,711

(22) Filed: Dec. 11, 2001

(65) Prior Publication Data

US 2003/0107779 A1    Jun. 12, 2003

(51) Int. Cl.
    H04N 1/04    (2006.01)
(52) U.S. Cl. ............... 358/474; 358/1.15; 358/505; 358/412; 358/410; 382/319
(58) Field of Classification Search ............... 358/1.15, 358/1.16, 474, 505, 513, 404, 442, 448, 412, 358/410, 409, 426.03, 444, 436, 486, 1.2; 382/319, 312, 318
    See application file for complete search history.

(56) References Cited

U.S. PATENT DOCUMENTS

| | | | |
|---|---|---|---|
| 4,166,280 A | 8/1979 | Poole | |
| 4,435,732 A | 3/1984 | Hyatt | |
| 4,680,699 A * | 7/1987 | Uchino | 406/180 |
| 4,739,396 A | 4/1988 | Hyatt | |
| 4,786,933 A | 11/1988 | Makino | |
| 5,225,914 A * | 7/1993 | Saito | 358/404 |
| 5,239,393 A | 8/1993 | Takeuchi | |
| 5,371,766 A * | 12/1994 | Gersbach et al. | 375/373 |
| 5,434,891 A * | 7/1995 | Mery et al. | 375/377 |
| 5,510,894 A | 4/1996 | Batchelder | |
| 5,579,419 A * | 11/1996 | Yaguchi et al. | 382/305 |
| 5,689,333 A | 11/1997 | Batchelder | |
| 5,760,727 A * | 6/1998 | Lin | 341/155 |
| 5,835,138 A * | 11/1998 | Kondo | 348/207.99 |
| 5,943,139 A * | 8/1999 | Tang et al. | 358/412 |
| 5,956,158 A * | 9/1999 | Pinzarrone et al. | 358/474 |
| 6,009,529 A * | 12/1999 | Park | 713/320 |
| 6,021,129 A * | 2/2000 | Martin et al. | 370/395.72 |
| 6,046,827 A | 4/2000 | Ogoshi | |
| 6,069,707 A | 5/2000 | Pekelman | |
| 6,100,924 A | 8/2000 | Truc | |
| 6,285,398 B1 | 9/2001 | Shinsky | |
| 6,344,906 B1 * | 2/2002 | Gatto et al. | 358/443 |
| 6,351,315 B2 * | 2/2002 | Kusumoto | 358/1.14 |
| 6,366,589 B1 * | 4/2002 | Naudus et al. | 370/468 |
| 6,459,506 B1 * | 10/2002 | Hu et al. | 358/473 |

(Continued)

Primary Examiner—Negussie Worku
(74) Attorney, Agent, or Firm—Stolowitz Ford Cowger LLP

(57) ABSTRACT

In accordance with the present invention, a method and a system for promoting scanning speed are provided. The method comprises steps of determining a transmission rate of a transit interface, adjusting system clock responsive to the transmission rate of the transit interface to change a data generated rate, and scanning an original to generate data at the rate controlled by the system clock. The key aspect of the present invention is by adjusting system clock to change the data generated rate corresponding to the transmission rate of the transit interface. Therefore, in response to the transmission rate of the transit interface, the system clock is adjusted to produce the data at a rate that can reduce the possibility of memory buffer full leading to the reduction in the time wasting on start-stop processes and therefore promote the scanning speed without requiring the increase in size of a memory buffer.

26 Claims, 2 Drawing Sheets

U.S. PATENT DOCUMENTS

| | | | |
|---|---|---|---|
| 6,462,842 B1 * | 10/2002 | Hamilton | 358/486 |
| 6,529,287 B1 * | 3/2003 | Wang et al. | 358/1.15 |
| 6,558,832 B1 * | 5/2003 | Bruck et al. | 429/34 |
| 6,580,457 B1 | 6/2003 | Armstrong | |
| 6,618,085 B2 | 9/2003 | Ishimoto | |
| 6,648,226 B2 * | 11/2003 | Haba | 235/454 |
| 6,747,764 B1 * | 6/2004 | Chu | 358/474 |
| 6,768,557 B1 * | 7/2004 | Minowa et al. | 358/1.15 |
| 6,781,711 B1 * | 8/2004 | Rijavec et al. | 358/1.2 |
| 7,006,260 B2 * | 2/2006 | Sato et al. | 358/448 |
| 7,009,721 B1 * | 3/2006 | Murata | 358/1.15 |
| 7,202,981 B2 * | 4/2007 | Wang | 358/486 |
| 2002/0003167 A1 * | 1/2002 | Cheng | 235/472.01 |
| 2002/0039139 A1 * | 4/2002 | Hsu et al. | 348/222 |
| 2002/0065966 A1 * | 5/2002 | Brief | 710/100 |
| 2002/0156941 A1 | 10/2002 | Boll | |
| 2003/0025949 A1 * | 2/2003 | Wang | 358/500 |
| 2003/0081143 A1 * | 5/2003 | Wang | 348/440.1 |

* cited by examiner

METHOD AND SYSTEM FOR PROMOTING SCANNING SPEED

BACKGROUND OF THE INVENTION

1. Field of the Invention

The present invention generally relates to a method and a system for promoting scanning speed, and more particularly to a method and a system for promoting scanning speed by adjusting system clock to change the data generated rate corresponding to the transmission rate of the transit interface.

2. Description of the Prior Art

Scanners are widely applied for the ability of generating digital representation of the information comprised by an original. The digital representation typically processed on a host device such as computer, and through an I/O cable data is transmitted from the scanner to the computer. The data transmission rate from the scanner to the host device is depended on the communication protocol used between the scanner and the host device. Ideally, digital data transferred to the host device is produced at the same rate that the host device can accept it. Therefore, no memory buffer is required for accumulating data that is waiting for transfer. However, the digital data is usually produced at a rate quite different from the data reception rate of the host device. If the transmission rate is higher than the data generated rate of the scanner, the scanner can run in full speed with no possible loss of data. However, the data generated rate of a scanner is usually faster than the transmission rate of the host computer. Therefore, when the transmission rate is lower than the data generated rate, issues related to the efficiency of the scanning operation often arise in the scanning operation.

Besides optical resolution, the scanning speed is another essential functional criteria of scanners. The scanning speed is the time that the scanner sends back scanned image to the host device after the scanning work is started. If the transmission rate is slower, the image data will be accumulated in a memory buffer, and the memory buffer may finally get full after only a portion of the original is scanned. In order to prevent the loss of the image data, the scanning operation is halted when the memory buffer is full and, then resumed when the memory buffer is empty or available for storing more data again. In other words, when the memory buffer is full, a scanning module driven by a motor is stopped and moved backward for a predetermined number of steps, due to the first few step motions of the scanning module being usually quite shaky and unstable that is caused by mechanical vibrations resulting in affecting the quality of the output in that period. Then, the scanning module is forwarded from there when the data accumulated in the memory buffer is transmitted to the host device. The processes of stopping and restarting the scan are alternatively performed till the scanning operation is completed. This method of preventing the loss of image data is useful, but it may cause the scanning of an original to take a long time because the scanning is stopped and restarted repeatedly.

The procedure of moving the scanning module backward and forward or, in other words, the procedure of stopping and restarting the scanning module is so called a smearing or start-stop process. This procedure might help to solve the problem of unstable scanning module or memory buffer full but it takes time to move the scanning module backward and forward, which may reduce the overall scanning speed of the scanner. Besides the start-stop process, in order to overcome the problems associated with data transfer from the scanner to the computer due to the varying transmission rate of the computer, lots of methods have been proposed. The increase in size of the memory buffer is one of the methods. The scanning of the original is thereby not affected by the varying capability of the computer to receive data. Enlarging memory buffer is quite straight forward and easy but with some drawbacks, that is, it also increases cost and complicates the manufacture of a scanner. Moreover, it may not really solve the problem when a high-resolution scan is performed, which can generate a huge amount of image data within a very short period of time, and it is not feasible to simply increase the memory buffer size to alleviate the problem.

A scanner with fast scanning speed can shorten the time while scanning of an original, speed up and increase work efficiency. Thus, it is imperative to develop a method and a system which reduces the possibility of memory buffer being full leading to the reduction of the time wasting on start-stop processes and thereby promoting the scanning speed without requiring the increase in size of a memory buffer.

SUMMARY OF THE INVENTION

The present invention is directed to a method and a system for promoting the scanning speed. The key aspect of the present invention is by adjusting system clock to change the data generated rate corresponding to the transmission rate of the transit interface. Therefore, in response to the transmission rate of the transit interface, the system clock is adjusted to produce the data at a rate that can reduce the possibility of memory buffer full leading to the reduction in the time wasting on start-stop processes and therefore promote the scanning speed without requiring the increase in size of a memory buffer.

It is another object of this invention that a method and a system for avoiding a start-stop process of the scanning mechanism are provided.

It is a further object of this invention that a method and a system for changing the data generated rate by use of adjusting the system clock corresponding to the transit interface are provided.

It is another further object of this invention that a method and a system for promoting scanning speed without requiring the increase in size of a memory buffer are provided.

In accordance with the present invention, in one embodiment, a method is provided for optimizing the scanning speed of a scanning system by adjusting system clock in response to a transit interface. The method comprises steps of determining a transmission rate of the transit interface, adjusting system clock responsive to the transmission rate of the transit interface to change a data generated rate, and scanning an original to generate data at the data generated rate. The data generated rate can be any rate reducing the data accumulation. The step of adjusting the system clock comprises multiplying a frequency generated by a clock generator by a multiplier according to the transmission rate, wherein the multiplier can be selected from a plurality of predetermined values. The method further comprises communicating the data from the scanning system to a host device through the transit interface.

In another embodiment, a method of optimizing scanning speed comprises steps of determining a transmission rate of a transit interface, comparing the transmission rate with a predetermined value, adjusting a system clock when the transmission rate is not equal to the predetermined value, and scanning an original to generate a data at a rate controlled by the system clock. The step of adjusting the system clock comprises increasing the system clock to increase the data generated rate when the transmission rate is faster than the predetermined value and reducing the system clock to reduce the data generated rate when the transmission rate is lower than the predetermined value. The method further comprises communicating the data from the scanning system to a host device through the transit interface.

In a third embodiment, a scanning system with adjustable data generated rate comprises a plurality of transit interfaces for data communicating between the scanning system and a host device, a system clock generator for generating a plurality of corresponding system clocks responsive to the transit interfaces, and a scanning module for scanning an original to generate the data at a rate controlled by the corresponding system clocks. The transit interface can be USB1.1, USB2.0, IEEE1394, EPP, and SCSI and not limited to those. When a transit interface with different transmission rates such as USB (USB1.1, USB2.0) and IEEE1394 (1394a, 1394b) series, the system clock generator generates the corresponding system clocks according to the transmission rates. The system clock generator comprises a clock generator such as crystal oscillator generating a frequency and a frequency multiplier for multiplying the frequency by a multiplier to generate the corresponding system clocks.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

It is widely known in the prior art that the digital data produced by a scanner is usually generated at a fixed rate due to the implement of a system clock of a constant duty cycle and operated at a fixed frequency. Therefore, the fixed data generated rate does not serve to optimize the scanning speed in response to the difference in transmission rate of a variety of transit interfaces. In other words, when the image data is generated at a rate faster than the transmission rate of a transit interface, or when a huge amount of the image data is generated within a very short time causing a memory buffer full, the start-stop process is unavoidable such that the time wasting on the start-stop process is also inevitable. Thus, the optimization of the scanning speed is out of question. In view of the drawbacks depicted in the prior art, the present invention provides a method and a system for adjusting the system clock corresponding to the transit interface to generate the image data at a rate for avoiding the start-stop processes and optimizing the scanning speed.

One aspect of the present invention is that due to the difference in transmission rate, the data is generated at a rate corresponding to the transmission rate of the transit interface to reduce the possibility of start-stop processes, that is, to prevent a memory buffer full. Other aspect of the present invention is that the data generated rate is changed by means of adjusting the system clock.

Figure 1:
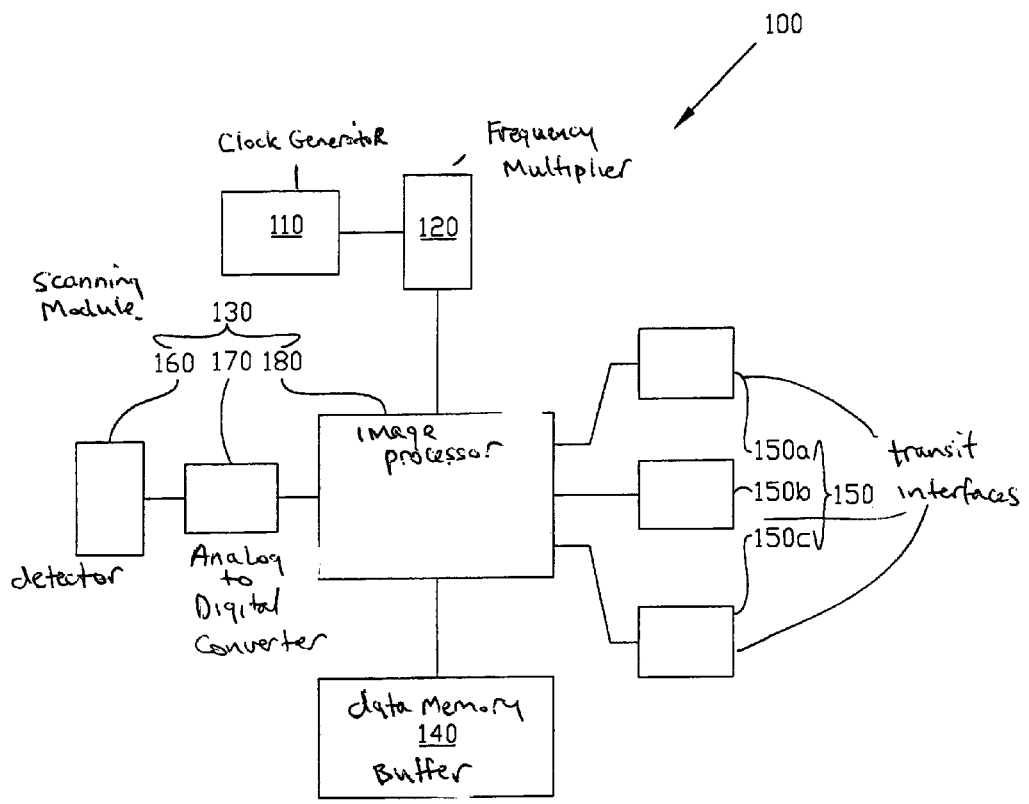
FIG. 1 is a schematic block diagram of a scanning system in accordance with the present invention.

Referring to FIG. 1, in one embodiment, a schematic block diagram of a scanning system 100 is shown. The scanning system 100 comprises a clock generator 110, a frequency multiplier 120, a scanning module 130, a data memory buffer 140, and a plurality of transit interfaces 150 such as transit interfaces 150a, 150b, and 150c. The scanning module 130 including a detector 160, an analog to digital converter (ADC) 170, and an image processor 180, is for scanning an original to generate image data at a rate controlled by a system clock. The transit interface 150 is for the data communication from a data generator to a host device, in the embodiment, from the scanning system 100 to a computer. The transit interface can be any commercial products with any communication protocols and transmission rates such as USB1.1, USB2.0, IEEE1394, EPP, and SCSI and not limited to those. The clock generator 110 can be a crystal oscillator, which produces a constant frequency (F). The frequency multiplier 120 can be a phase lock loop circuit, which multiplies the constant frequency (F) by a multiplier (M) to adjust the system clock according to the transit interface 150, thus the image data is generated at a rate preventing the memory buffer 140 full. In short, the combination of the clock generator 110 and the frequency multiplier 120 is a system clock generator, which generates corresponding system clocks according to the transit interface or the transmission rate of the transit interface. Therefore, the scanning system 130 is operated at a multiplied frequency (F times M) for generating data controlled by the system clock.

Additionally, the frequency of the system clock can be determined by multiplying the frequency (F) generated by the clock generator 110 by one multiplier selected from a plurality of built-in multipliers according to the transmission rate. In other words, every transit interface has a corresponding frequency of the system clock built in the scanning system. When the transit interface is determined, the scanning module 130 is operated at the corresponding frequency of the system clock to generate the image data. For example, if the transit interface is USB1.1 and IEEE1394, the frequency of the system clock is the frequency (F) times 2 and 3, respectively, wherein 2 and 3 are selected from the plurality of built-in multipliers. That is, the frequency of the system clock for USB1.1 and IEEE1394 are 2F and 3F, respectively. Thus, the possibility of the memory buffer full is reduced and the start-stop process is diminished resulting in the optimization of the scanning speed.

Figure 2A:
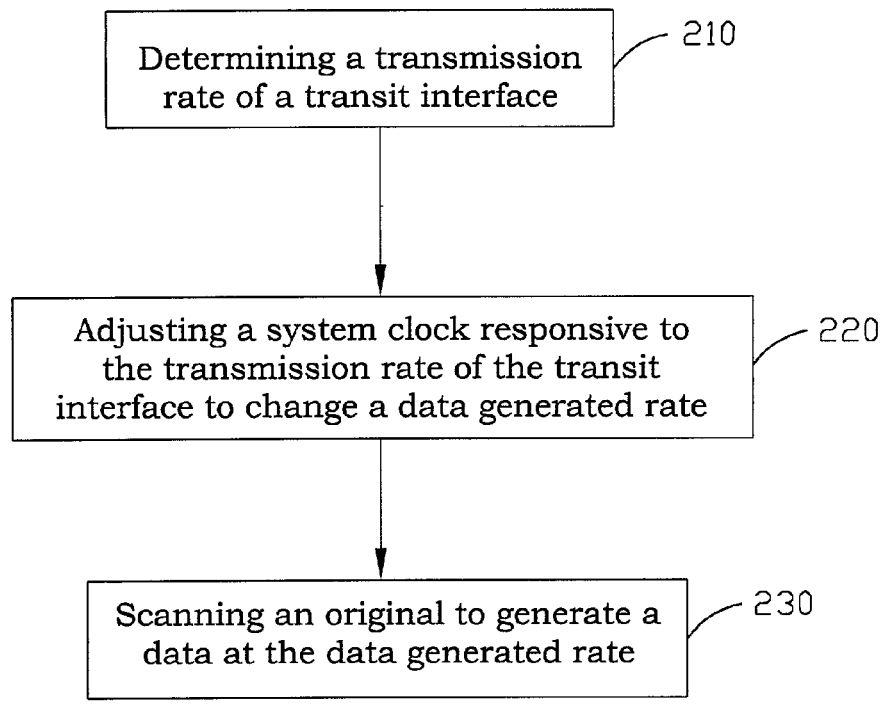
FIG. 2A is a flow diagram of a scanning method in accordance with one embodiment of the present invention.

In accordance with the present invention, a method for adjusting a system clock according to the transit interface is also provided, which promotes the scanning speed. Referring to FIG. 2A, a flow chart of implementing the present invention by the scanning system is illustrated. The method starts from step 210, the transit interface used in the scanning process is determined such as the transit interface 150a is implemented. It is noted that when the transit interface is determined, the transmission rate can also be determined. For example the transit interface can be a USB 2.0 with a transmission rate of 480 Mbit/sec or running at a rate of 12 Mbit/sec, or a USB1.1 with a transmission rate of 12 Mbit/sec. The transmission rate of the transit interface can be determined by a signal sent to the scanning system in the process of initializing the scanning system or by a firmware prior to starting a scanning operation.

In the step of 220, a system clock is determined according to the transit interface. That is, the scanning module is operated at a frequency to generate data at a rate that prevents the memory buffer full. The frequency of the system clock can be determined by multiplying the frequency (F) of a clock generator by a multiplier responsive to the transmission rate of the transit interface. For example, the USB transit interface can have three transmission rates, high-speed of 480 Mbit/sec, full-speed of 12 Mbit/sec, and low-speed which is seldom used for data transfer. The frequency of the system clock (or the multiplier) is determined when the transmission rate is determined. If the transit interface has a high transmission rate such as IEEE 1394, EPP, and SCSI, the data is generated at highest frequency a system clock can produce due to the transmission rate is greatly faster than the data generated rate in the present technology. When the transit interface has a low transmission rate such as USB 1.1, the data is generated at lower frequency a system clock can produces to prevent the memory buffer full. As depicted in step 230, the original is scanned to generate the data at a rate controlled by the system clock.

Figure 2B:
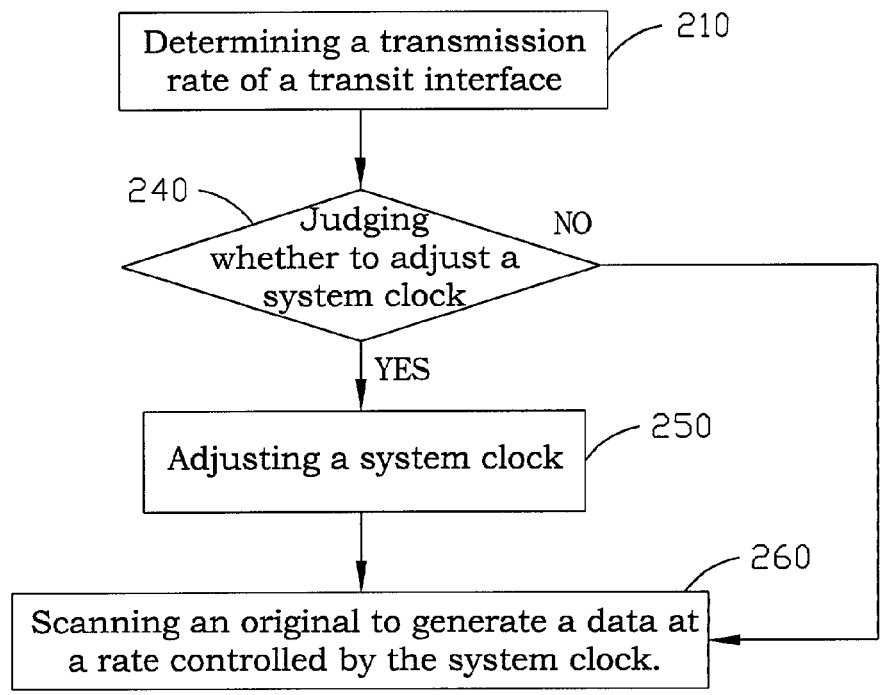
FIG. 2B is a flow diagram of a scanning method in accordance with another embodiment of the present invention.

Additionally, FIG. 2B shows a flow diagram of promoting the scanning speed in accordance with another embodiment. The method starts from the same step of 210, the transit interface used in the scanning process is determined such as the transit interface 150*a* is implemented. In the step of 240, decision of adjusting the system clock is made. The system clock is adjusted according to the result of comparing the transmission rate of the transit interface 150*a* with a predetermined transmission rate. When the transmission rate of the transit is different from a predetermined value, the system clock is adjusted in the step of 250. In more details, when the transmission rate of the transit interface is faster than the predetermined transmission rate, the system clock is increased to increase the data generated rate. On the other hand, if the transmission rate of the transit interface is lower than the predetermined transmission rate, the system clock is adjusted to reduce the data generated rate. Then, in the step of 260, the scanning of an original is started to generate data at a rate controlled by the system clock.

For example, in accordance with the present invention, in the scanning procedure, the transmission rate of a transit interface 150 such as USB 1.1 is first determined. When an optical detector 160 such as charge coupled device (CCD) generates analog image data in the scanning of the original, the analog to digital converter (ADC) 170 is for converting the analog image data to digital data. Then, the image processor 180 of the scanning module 130 generates the image data under the control of the system clock with a corresponding frequency (such as 2F in the example) produced by the frequency multiplier 120 such as phase lock loop circuit, which is the frequency (F) generated by the clock generator 110 times a multiplier such as 2. Therefore, the data generated rate is changed to a rate preventing the memory buffer 140 full leading to the reduction in the time wasting on the start-stop process. Thus, the scanning speed is promoted without the requirement of increasing the memory buffer.

Although specific embodiments have been illustrated and described, it will be obvious to those skilled in the art that various modifications may be made without departing from what is intended to be limited solely by the appended claims.

What is claimed is:

1. A method comprising:
observing which one of a plurality of transmit interfaces is selected for transferring data between a scanner and a general purpose computer and, after observing which transmit interface is selected, identifying a predefined maximum data transfer rate associated with the observed transmit interface;
selecting a clock multiplier according to the identified predefined maximum transfer rate;
adjusting a scanning system clock of the scanner to control a data generation rate of the scanner, said adjustment performed by utilizing the selected clock multiplier; and
performing a scanning operation using the adjusted scanning system clock to generate scanning data at said data generation rate, the data generation rate corresponding to the identified predefined maximum data transfer rate.

2. The method according to claim 1, further comprising transmitting said scanning data from said scanner to said general purpose computer using the observed transmit interface.

3. The method according to claim 1, wherein said adjusting the scanning system clock comprises executing software instructions.

4. The method of claim 3, wherein the software instructions are embodied on hardware.

5. The method of claim 3, wherein the software instructions are embodied on firmware.

6. The method according to claim 1, wherein the selected data interface comprises a data interface selected from the group consisting of: high-speed USB and full-speed USB.

7. The method according to claim 1, wherein the data generation rate is less than a default data generation rate for the scanner.

8. The method according to claim 1, further comprising:
accessing a plurality of predefined clock multipliers stored in a memory of the scanner, the predefined clock multiplier values associated with the plurality of transmit interfaces;
comparing the identified predefined maximum transfer rate to the stored and predefined clock multiplier values; and
selecting the clock multiplier according to the comparison.

9. The method according to claim 1, wherein said clock multiplier comprises a value selected from a plurality of predetermined values.

10. The method according to claim 1, wherein said adjusting said system clock comprises changing the frequency of said system clock to produce a data generation rate that is different than a default data generation rate of the scanner.

11. The method of claim 1, wherein adjusting the scanning system clock comprises adjusting the scanning system clock based at least in part on the identified predefined maximum transfer rate.

12. A scanning system comprising:
a plurality of data interfaces configured to provide data between a scanner and a host device;
a system clock generator circuitry configured to provide a plurality of different selectable system clocks;
selection circuitry configured to observe which one of a plurality of data interfaces is used to communicatively couple the scanner and the host device, the observed data interface associated with a predefined data transfer rate, the selection circuitry to select one of the different system clocks according to which data interface is observed; and
a scanning module to generate data at a rate based on the selected system clock.

13. The system according to claim 12, wherein the plurality of data interfaces comprises a data interface selected from the group consisting of: USB, IEEE1394, EPP, and SCSI.

14. The system according to claim 12, wherein the predefined data transfer rate is a maximum theoretical transfer rate of an associated one of the data interfaces.

15. The system according to claim 12, wherein the selection circuitry is configured to select one of the different system clocks based solely on which data interface is observed.

16. The system according to claim 12, wherein said system clock generator circuitry further comprises:
   a clock generator capable of generating a frequency, and
   a component to select a frequency multiplier capable of multiplying said frequency by a plurality of multipliers to provide the plurality of different selectable system clocks.

17. A scanning module, comprising:
   circuitry to identify which transmission protocol, or which version of a single transmission protocol, is to be utilized for transferring image data between the scanning module and a host device;
   wherein the identified transmission protocol or transmission protocol version is associated with a predefined data transfer rate that is different than a predefined data transfer rate of one of the unselected transmission protocols or unselected transmission protocol versions;
   the circuitry to configure a system clock according to which transmission protocol, or which version of the single transmission protocol, is identified; and
   an image processor to generate the image data, wherein the image processor is adapted to generate said image data at a data generation rate based on the configured system clock.

18. The scanning module of claim 17, wherein said data interfaces comprises one or more data interfaces selected from the group consisting of: USB, IEEE1394, EPP, and SCSI.

19. The scanning module of claim 17, wherein said associated system clock is adjusted in accordance with the data transmission rate of the selected data interface.

20. The scanning module of claim 17, further comprising a charge-coupled device (CCD).

21. The scanning module of claim 17, wherein said circuitry to configure the system clock comprises firmware.

22. The scanning module of claim 17, further comprising a memory buffer to store at least a portion of the generated image data prior to providing to a host device.

23. A system, comprising:
   means for providing data between the system and a host device, the means for providing data operating according to one of a plurality of different predefined maximum transfer rates depending on which one of a plurality of transmit interfaces is utilized;
   means for generating a plurality of system clocks, the system clocks corresponding to the different predefined maximum transfer rates;
   means for selecting between the system clocks based on which one of the plurality of different predefined maximum transfer rates is utilized by the providing means; and
   means for generating data at a rate based on the selection.

24. The system according to claim 23, wherein the plurality of different predefined maximum transfer rates includes a 12 Mbit/s maximum transfer rate and a 480 Mbit/s maximum transfer rate, and a first one of the system clocks is selected if the providing means operates according to the 12 Mbit/s maximum transfer rate and a second one of the system clocks having a frequency greater than the first one of the system clocks is utilized if the providing means operates according to the 480 Mbit/s maximum transfer rate.

25. The system according to claim 23, wherein the means for generating the system clocks further comprises:
   means for generating a frequency; and
   means for multiplying the frequency by a plurality of multipliers to generate the system clocks.

26. The system of claim 23, wherein the selecting means operates according to which one of the different predefined maximum transfer rates is utilized by the providing means and independently of an actual transfer rate utilized by the providing means.

* * * * *